United States Patent [19]

Kiczek

[11] Patent Number: 4,866,950
[45] Date of Patent: Sep. 19, 1989

[54] METHOD AND APPARATUS FOR COOLING FRUIT TO A SELECT TEMPERATURE

[75] Inventor: Edward F. Kiczek, Long Valley, N.J.

[73] Assignee: Air Products and Chemicals, Inc., Allentown, Pa.

[21] Appl. No.: 181,145

[22] Filed: Apr. 13, 1988

[51] Int. Cl.⁴ ............................................. F25D 17/02
[52] U.S. Cl. ....................................... 62/374; 62/380
[58] Field of Search ............................ 62/63, 374, 380

[56] References Cited

U.S. PATENT DOCUMENTS

| | | | |
|---|---|---|---|
| 1,698,430 | 1/1929 | Cribari | 99/493 |
| 2,398,440 | 4/1946 | Monnet | 146/76 |
| 2,602,750 | 7/1952 | Cunningham | 99/205 |
| 3,205,078 | 9/1965 | Lund | 99/205 |
| 3,214,928 | 11/1965 | Oberdorfer | 62/380 |
| 3,238,736 | 3/1966 | Macintosh | 62/380 |
| 3,255,608 | 6/1966 | Macintosh | 62/380 |
| 3,413,818 | 12/1968 | Pelmulder | 62/380 |
| 3,935,317 | 1/1976 | Bianchi | 426/15 |
| 4,481,782 | 11/1984 | Mukerjee | 62/380 |
| 4,487,785 | 12/1984 | Epchtein et al. | 426/15 |
| 4,697,508 | 10/1987 | Pallafus | 99/517 |

*Primary Examiner*—Ronald C. Capossela
*Attorney, Agent, or Firm*—James C. Simmons; William F. Marsh

[57] ABSTRACT

A process and apparatus for extracting musts from fruit by rapid cooling said fruit to a temperature below 0° C. followed by homogenizing the temperature of batches of said fruit prior to processing. The apparatus includes a cryogenic tunnel freezer in combination with a homogenizing/discharge hopper with refrigeration provided by a liquid cryogen such as liquid nitrogen.

18 Claims, 4 Drawing Sheets

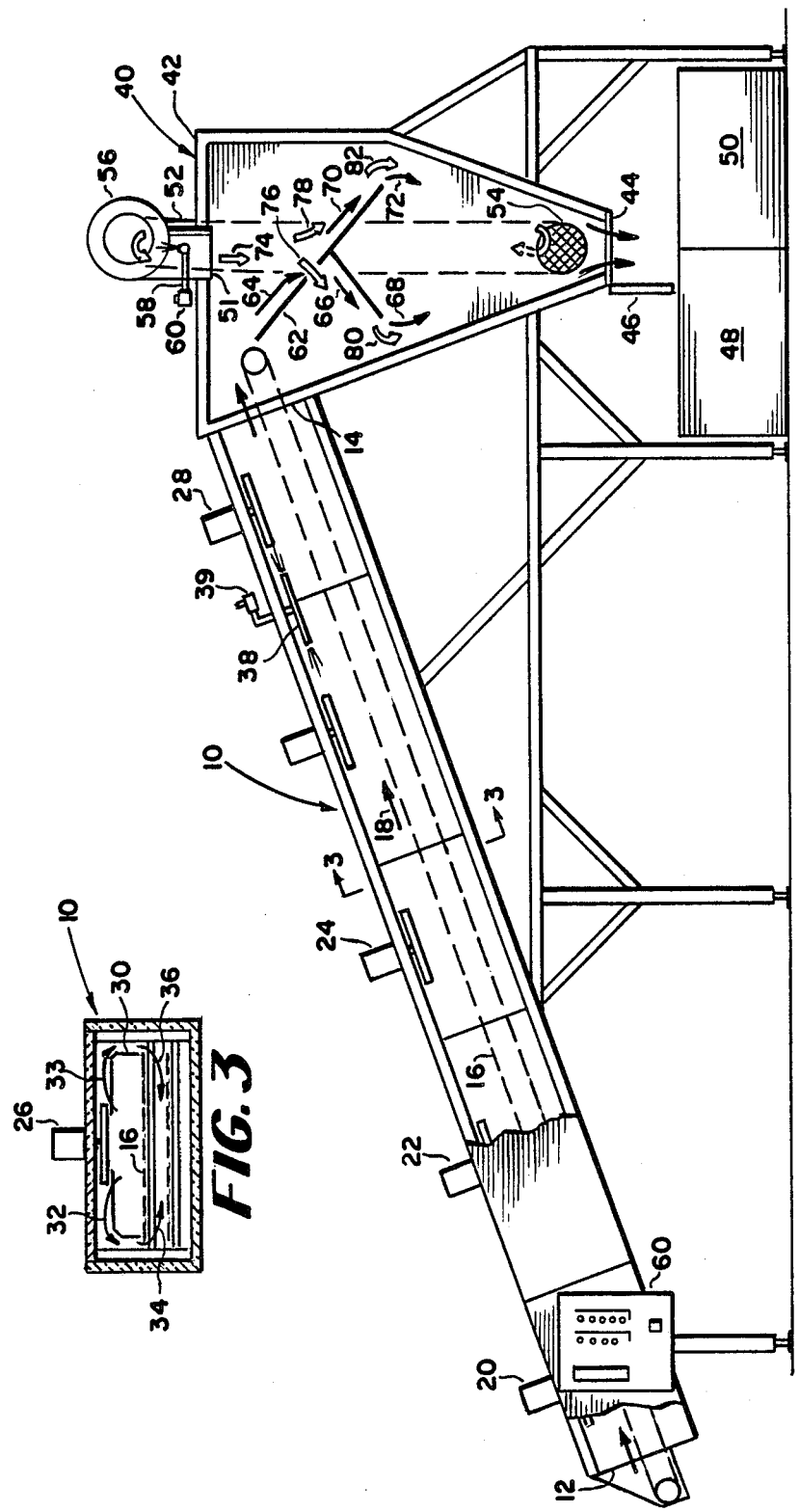

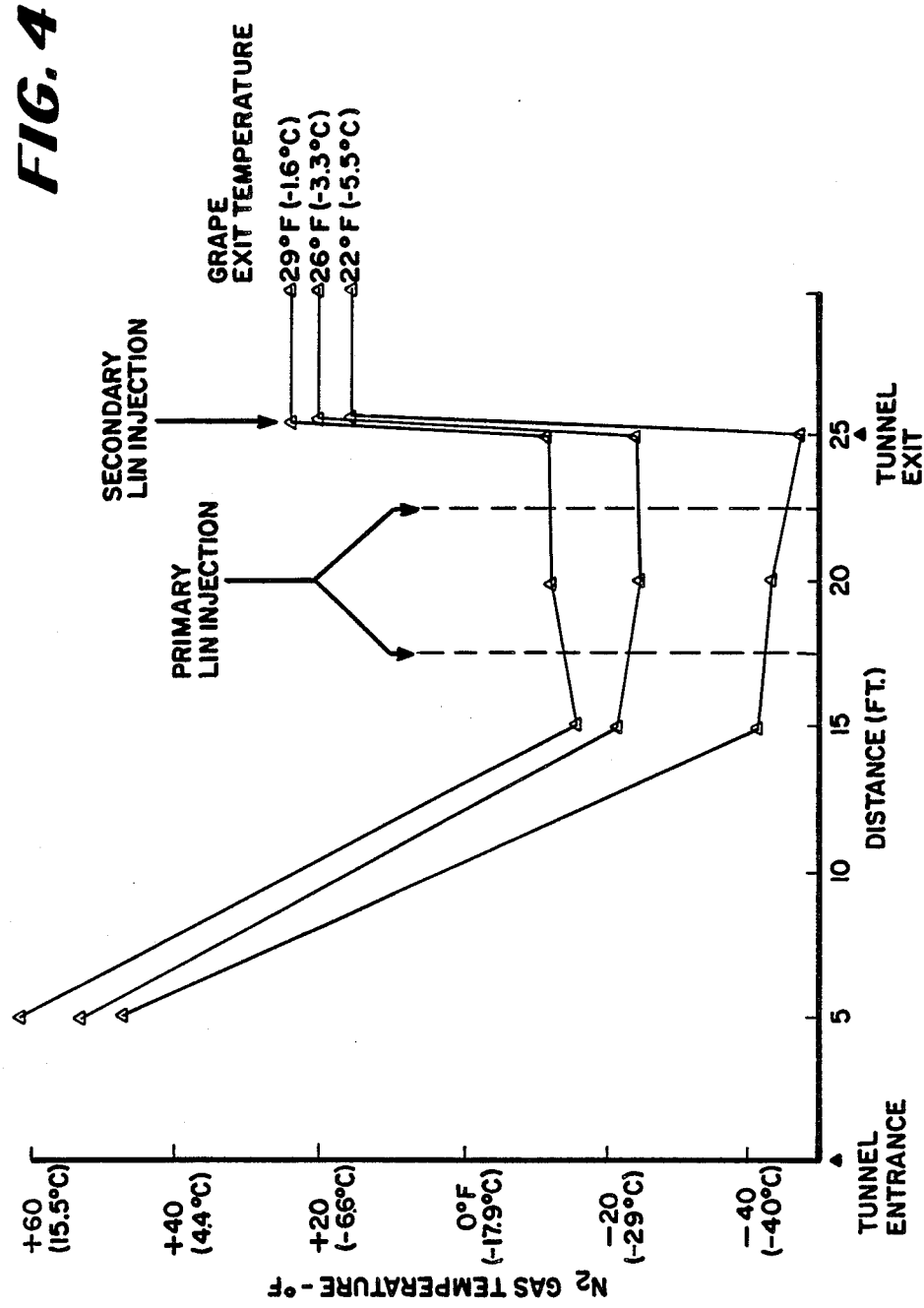

METHOD AND APPARATUS FOR COOLING FRUIT TO A SELECT TEMPERATURE

TECHNICAL FIELD

The invention pertains to cooling of fruit to subfreezing temperature to enhance extraction of musts.

BACKGROUND OF THE PRIOR ART

In order to enrich the sugar content of fruit juices in the past, the fruit, e.g. grapes, has been subjected to a freezing process prior to crushing to extract the juice. This is usually accomplished in a batch-type refrigerator or freezer box unit employing both cryogenic and mechanical refrigeration. The process is labor intensive and usually requires processing times of between 12 and 24 hours per batch of fruit.

In Germany, the so-called Ice Wine process has recognized the importance of pressing a grape which has been cooled to a temperature of between 0° C. and −15° C. An improvement on the German Ice Wine process is disclosed in French Patent Application 8600115, filed Jan. 7, 1986 and titled "Process for Obtaining Must". Applicants disclose freezing fruit such as grapes at a selected temperature between −6° and −15° C. and pressing them in the frozen state to obtain an enriched juice, particularly one that is enriched in sugar. The process of the prior art has been used, for example, to save grapes that have been left on the vine too long and because of prolonged rain have absorbed extra water. By freezing the grapes and crushing them, the water can be separated out as ice, thus having a must of more uniform sugar content.

Grapes from the same bunch have been shown to vary in composition. It is because of this compositional imbalance their freezing points and heats of solidification vary and are highly dependent upon the sugar content of the individual grape. Cold pressing of the grapes takes advantage of these thermodynamic properties by pressing the grapes at a temperature of between 0° and −15° C. Thus, the grapes can be pressed repeatedly at several warmer temperatures, to extract juices of decreasing quality. Employing this process has three distinct benefits. These are, an increased ability to extract musts due to cellular degradation at low temperatures, selective extraction by pressing at controlled temperatures, and concentration of musts by retention of ice crystals in the pulp during the processing. Unfortunately this process cannot be practiced on a commercial scale due to limitations in equipment and process technology.

Although no apparatus has been developed to effect the prior art process in relation to continuous processing of grapes for wine making, chilling of vegetables has been accomplished by devices such as shown in U.S. Pat. No. 4,697,508. However such a device would not be effective for handling fruit such as grapes because of the tendency to prematurely extract juice from the grapes.

BRIEF SUMMARY OF THE INVENTION

The present invention relates to a process and apparatus that is ideally suited to cool fruit such as grapes to a uniform temperature and equilibrate the temperature of the grapes on a continuous basis so that individual batches can be withdrawn and pressed on demand. The apparatus of the present invention utilizes a cryogenic tunnel type freezer to rapidly cool the fruit to a temperature below 0° C. in connection with a homogenizing container to hold individual batches of the grapes at the subzero temperature for withdrawal and processing. The process and the apparatus of the present invention permit the user to, upgrade premium wines, save poor crops by early harvest, and increase the yield per acre while producing the same quality juice by allowing overcropping of a particular vineyard.

The process is practiced in two distinct steps to attain a precise bulk temperature for subsequent juice extraction by a cold pressing technique.

BRIEF DESCRIPTION OF THE DRAWING

FIG. 2 is a front elevational view of the apparatus of FIG. 1 with portions removed to show internal details thereof.

FIG. 3 is a section taken along the line 3—3 of FIG. 2.

FIG. 4 is a plot of nitrogen gas temperature versus location of fruit in the apparatus according to the invention.

DETAILED DESCRIPTION OF THE INVENTION

Figure 1:
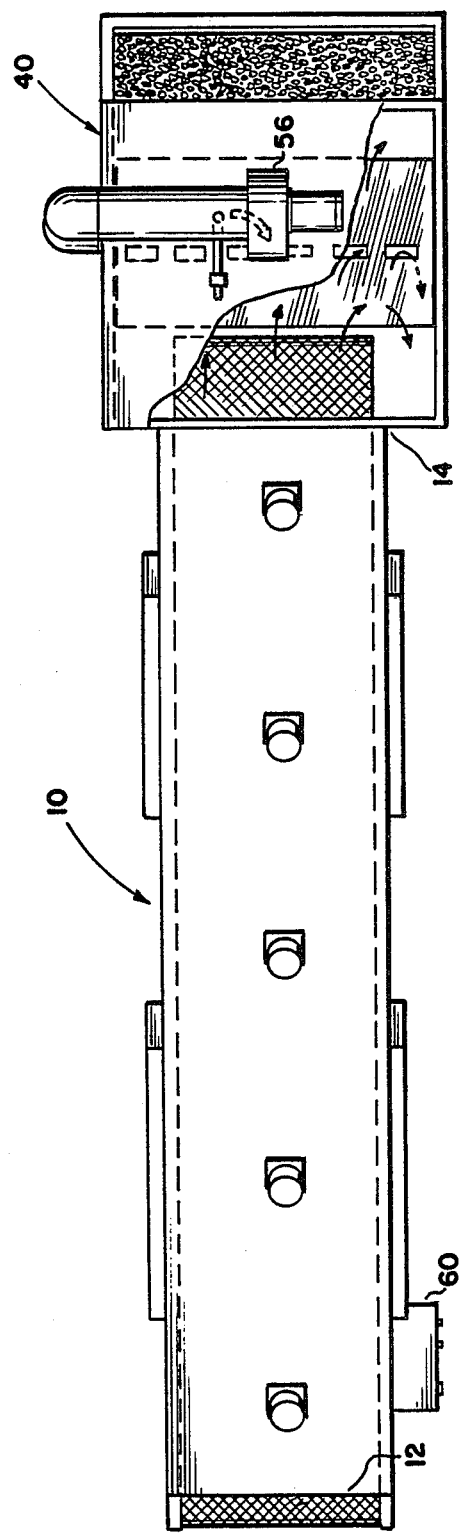
FIG. 1 is a top plan view of an apparatus according to the invention.

The process of the present invention is best understood in reference to the apparatus of the present invention shown in FIGS. 1-3. Referring to FIGS. 1 and 2, the invention embodies two distinct processes on a continuous basis to achieve the desired result. The first process step is a rapid cooling step which takes place in the first or rapid cooling section of the apparatus of the invention shown generally as 10. Section 10 is preferably in the form of a tunnel having an inlet end 12 and an outlet end 14. The tunnel has disposed within its interior a continuous belt 16 which is adapted to continuously advance product through the tunnel in the direction shown by arrow 18. The belt 16 projects from inlet end 14 to provide means for loading fruit on the belt 16. Likewise the belt 16 projects beyond the discharge end 14 of tunnel 10 as will hereinafter be more fully explained. The structure of the belt and the mechanism for driving the same is well known in the art and has been practiced for many years by firms such as Air Products and Chemicals, Inc. who offer similar tunnels under the Cryo-Quick trademark. Tunnel 10 includes a plurality of fans 20, 22, 24, 26 and 28 for causing recirculation of the atmosphere inside the tunnel. What sets the recirculating pattern of the tunnel according to the present invention apart from devices of the prior art is shown in FIG. 3 wherein an internal baffle 30 is disposed throughout the length of the tunnel 10. Baffle 30 forces recirculation of the atmosphere inside the tunnel transverse to the direction of travel of the belt 16 as shown by the arrows 32, 33, 34 and 36 in FIG. 3. Disposed proximate the discharge end 14 of tunnel 10 is a cryogen spray device or header 38 which permits introduction of a cryogen such as liquid nitrogen into the tunnel 10 in a direction generally parallel to the path of travel of the conveyor 16. The cryogen eventually contacts fruit which is placed on the conveyor 16 to cause a final desired low temperature in the tunnel to be achieved, with the fans 20-28 being used to recirculate the cold vaporized cryogen to, inter alia, precool the incoming grapes at the entry end 12 of tunnel 10. The result of the processing arrangement is to provide a homogeneous grape temperature by minimizing temperature discrepancy between individual grapes. Tunnel 10 discharges the fruit into the second or homogenizing section of the apparatus shown generally as 40. The homogenizing section is in the general shape of a hopper having a first or top end 42 which may be closed by a cover and a second or discharge end 44 which includes a bulk discharge door 46 for periodically discharging product into receptacles such as bins 48, 50. Homogenizing section 40 includes a recirculating system comprising a conduit 52 which has an inlet 54 disposed proximate the discharge end 44 and an outlet in the top 42 of homogenizer 40. Circulation can be effected by means of a fan or blower 56 as is well known in the art. Disposed within the upper portion of conduit 52 where it re-enters the homogenizer 40 at 51, there is disposed a suitable device such as a manifold or spray header 58 for introducing a cryogen into the fluid recirculating through homogenizer 40. The manifold 58 can be controlled by a suitable valve 60. Supply of cryogen can be provided by a single source of supply via conduits (not shown) to valve 60 associated with manifold 58 and valve 39 associated with manifold 38. Valves 39 and 60 in turn can be individually controlled by suitable temperature controllers (not shown) as are well known in the art which controls can be embodied in the panel 60 shown in the drawing. Disposed within homogenizing section 40 is a distribution plate or baffle 62 which receives the fruit discharged from conveyor 16 and spreads it evenly within homogenizer 40 so it is contacted with the recirculating atmosphere in homogenizer 40. Product flow through homogenizer 40 is shown by arrows 64, 66, 68, 70 and 72 and atmosphere recirculation is shown by arrows 74, 76, 78, 80 and 82. The entire apparatus can be disposed and fixed in place by conventional structural members such as illustrated in the Drawing.

In practice, the present invention consists of two distinct cooling processes to achieve the desired result of rapidly cooling and maintaining at a lower temperature a product, e.g. grapes, which can be subjected, on a continuous basis, to processing by juice extraction (pressing) at the lower temperature. The rapid cooling takes place in the rapid cooling section 10 by loading the grapes on the conveyor and having the grapes progress upwardly by means of conveyor 16 to be contacted by the liquid cryogen to a temperature significantly below freezing. Typically, the rapid cool section can operate at temperatures as low as −30° C., which although being provided by cryogenic means, do not expose the grapes to cryogenic temperatures. The grapes exiting the rapid cooling section 10 are then disposed in the homogenizer 40 which is maintained at a temperature of approximately 5°–10° C. below the temperature at which they will be pressed. The grapes are then held in the homogenizer 40 until needed for further processing when they can be withdrawn from the bottom of homogenizer 40 and loaded into a bin for conveying to the pressing operation. The break point between rapid cooling and homogenizing insofar as temperature is concerned is important since it increases the grapes' ability to retain the juices and therefore allows a more rigorous treatment in the homogenizer without having premature juice extraction. Referring to FIG. 4, the graph shows a plot of nitrogen gas temperature against distance in the first or rapid cool section of the apparatus according to the present invention followed by the temperature achieved in the second or homogenizing portion of the invention. The three curves are for batches of grapes that had three different exit temperatures selected to produce different characteristics in the juice after pressing. As is shown in FIG. 4, the grapes were rapidly cooled to below approximately 0° C. in the tunnel 10 so that the thus partially frozen grapes will not be prematurely crushed during storage and temperature homogenization in homogenizer 40. The grapes entering homogenizer 40 are further cooled by means of the recirculating gas maintained 5° to 10° C. below the desired final grape temperature of between 0° to −15° C. prior to processing. The graph also indicates the primary and secondary cryogen injection points which correspond to injection of the cryogen via manifolds 38 and 58, respectively. The grapes processed according to the results plotted in FIG. 4 were based upon a belt speed in the rapid cool section of 1.77 ft/min and a holding time in the homogenizer of approximately 15 minutes.

The rapid cooling section 10 provides high forced convective currents through the product depth on belt 16 because the recirculating fans 20, 22, 24, 26, 28 in conjunction with the cryogen injected through manifold 38 provide high force convective currents of cold gas through the product depth. The product being conveyed on a open weave belt 16 may become partially frozen and is discharged into a homogenizing section where the remaining latent heat cooling is achieved. The homogenizer 40 uses liquid cryogen injection to achieve the final desired product temperature. Upon filling of the homogenizer 40, an entire batch uniform in temperature can be discharged into the discharge bins 48, 50 for conveying to a press such as a Wilmes bladder-type press commonly used in the winery. The total process time from cooling to pressing is approximately one-half hour which is commensurate with conventional winery pressing operations. Because of the baffles used in the rapid cooling section, there is an improvement in the heat transfer characteristics of the tunnel by relying on aerodynamic techniques resulting from the baffle. Thus, the belt can be loaded to a greater depth (e.g. 8″ versus 3″) to increase product throughput. More importantly, the uniform flow field gives the added advantage of attaining excellent homogeneous grape temperatures (±2° C.) at the tunnel exit. Thus the process in total allows for maximum cryogenic cooling efficiency to a target temperature by virtue of very high gas exhaust temperatures (−15° C.) In addition, the process and the apparatus of the present invention facilitate readily attaining a desired target temperature (±1° C.) heretofore not achieved in cold pressing of grapes. The precise homogeneous temperature of each batch of grapes results in maximizing juice quality during subsequent extraction by pressing.

Figure 5:
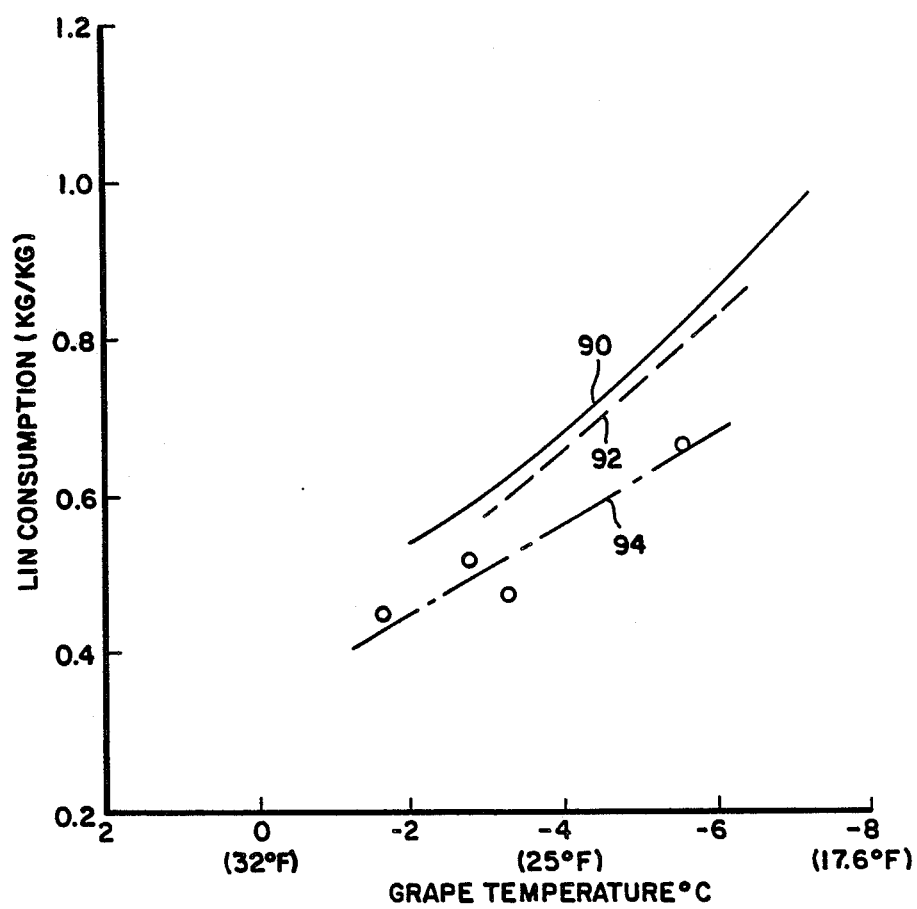
FIG. 5 is a plot of liquid nitrogen consumption against grape temperature for two prior art devices and the process and apparatus of the present invention.

FIG. 5 shows the average liquid nitrogen consumption that would be required to achieve the same refrigeration for batches of grapes using a box freezer, a tunnel not improved according to the present invention, and the apparatus of the present invention. The box freezer curve is identified as 90, the tunnel freezer (unimproved according to the present invention) curve is identified as 92 and the apparatus of the present invention is identified as curve 94. Thus an added benefit achieved with the present invention is the result in the consumption of a consumable and thus reduced cost to the food processor to achieve musts upon extraction that are of outstanding quality, Furthermore, results with the apparatus of the present invention resulted in liquid nitrogen (LIN) consumption rates of between 0.4 and 0.66 with commensurate sugar content increases from the base produced wine of between 10 and 50% with acid increases of 10 to 30% to a more desirable pH.

While the present invention has been described with the rapid cooling section comprising a tunnel alternate structures, such as a rotary tumbler device to move the grapes from an inlet end to an outlet end which communicates with the homogenizer can be used. It is also within the scope of the present invention to have a continuous second or homogenizing section in the form of a tunnel or spiral freezer or the like.

Having thus described my invention, what is desired to be secured by Letters Patent of the United States is set forth in the appended claims.

I claim:

1. An apparatus for cooling fruit to attain and maintain a precise homogeneous bulk temperature for subsequent juice extraction comprising in combination:
   a first or rapid cooling section having an inlet end and an outlet end said section having means to move said fruit from said inlet end to said outlet end;
   means to introduce a liquid cryogen into said first section;
   means to recirculate vaporized liquid cryogen in said first section in a path generally transverse to the direction of travel of said belt; and
   a second or homogenizing section having a first end communicating with the outlet end of said first section, said second section adapted to receive said fruit from said first section, said second section having means to recirculate a gaseous cryogen through said held fruit and a second or discharge end containing means to discharge said fruit from said second section;
   whereby said fruit is rapidly cooled and then homogenized in temperature to prevent premature juice extraction from the fruit.

2. An apparatus according to claim 1 wherein said first section is in the form of an elongated tunnel having a continuously moveable belt disposed therein.

3. An apparatus according to claim 2 wherein said tunnel has an internal thin walled baffle extending longitudinally for a substantial length of the tunnel and a plurality of recirculating fans so constructed and arranged to, in combination with said baffle, create a transverse recirculating flow path for said vaporized cryogen.

4. An apparatus according to claim 1 wherein said second section is in the form of a receptacle to hold a quantity of said fruit, said second section including means to periodically discharge said fruit from said second section.

5. An apparatus according to claim 1 wherein said first section is in the form of an elongated tunnel positioned at an angle, said tunnel utilizing an integral continuously moveable belt to move said fruit from a convenient floor level loading height to the top of said second section disposed vertically in relation to said first section.

6. An apparatus according to claim 5 wherein said means to introduce liquid cryogen consists of a spray header having outlets for directing cryogen parallel to the movement of said belt.

7. An apparatus according to claim 6 wherein means for introducing a liquid cryogen is disposed inside said recirculating means at the top of said hopper.

8. An apparatus according to claim 1 including means to introduce a liquid cryogen into said first section proximate said outlet end of said first section.

9. An apparatus according to claim 1 wherein said second or homogenizing section is in the form of a hopper having an internal baffle communicating with said belt in said first section to receive said fruit from said first section and facilitate contact with said cryogen by recirculation of said cryogen in said second section.

10. An apparatus according to claim 8 wherein said hopper is a closed unit including means to withdraw the internal atmosphere from a point proximate the discharge end and recirculate it into the top of said hopper in a downwardly direction.

11. An apparatus for cooling fruit to attain and maintain a precise homogeneous bulk temperature for subsequent juice extraction comprising in combination:
   a first or rapid cooling section having an inlet end and an outlet end with a continuously movable belt disposed therein to move said fruit from said inlet end to said outlet end;
   means to introduce a liquid cryogen into said first section;
   means to recirculate vaporized liquid cryogen in said first section in a path generally transverse to the direction of travel of said belt; and
   a second or homogenizing section having a first or top end communicating with the outlet end of said first section, said second section adapted to receive and hold a quantity of said fruit with means to recirculate a gaseous cryogen through said held fruit and a second or discharge end containing means to periodically discharge said fruit from said second section;
   whereby said fruit is rapidly cooled and then homogenized in temperature to prevent premature juice extraction from the fruit.

12. An apparatus according to claim 11 wherein said first section is in the form of an elongated tunnel positioned at an angle so that said belt moves said fruit from a convenient floor level loading height to the top of said second section disposed vertically in relation to said first section.

13. An apparatus according to claim 12 wherein said tunnel has an internal thin walled baffle extending longitudinally for a substantial length of the tunnel and a plurality of recirculating fans so constructed and arranged to, in combination with said baffle, create a transverse recirculating flow path for said vaporized cryogen.

14. An apparatus according to claim 11 including means to introduce a liquid cryogen into said first section proximate said outlet end of said first section.

15. An apparatus according to claim 14 wherein said means to introduce liquid cryogen consists of a spray header having outlets for directing cryogen parallel to the movement of said belt.

16. An apparatus according to claim 11 wherein said second or homogenizing section is in the form of a hopper having an internal baffle communicating with said belt in said first section to receive said fruit from said first section and facilitate contact with said cryogen by recirculation of said cryogen in said second section.

17. An apparatus according to claim 16 wherein said hopper is a closed unit including means to withdraw the internal atmosphere from a point proximate the discharge end and recirculate it into the top of said hopper in a downwardly direction.

18. An apparatus according to claim 17 wherein means for introducing a liquid cryogen is disposed inside said recirculating means at the top of said hopper.

* * * * *